June 8, 1943.    E. F. MILLER    2,321,308
WELD BACKING CONSTRUCTION
Filed April 15, 1942

WITNESSES:

INVENTOR
ERNEST F. MILLER.
BY
ATTORNEY

Patented June 8, 1943

2,321,308

UNITED STATES PATENT OFFICE 2,321,308

WELD BACKING CONSTRUCTION

Ernest F. Miller, Lansdowne, Pa., assignor to Westinghouse Electric & Manufacturing Company, East Pittsburgh, Pa., a corporation of Pennsylvania Application April 15, 1942, Serial No. 438,987

8 Claims. (Cl. 113—111)

This invention relates to weld backing elements, more particularly to those of the ring type, and has for an object to provide a welding ring which may be readily removed after completion of the welding operation.

The use of welding rings inside of pipe is necessary to prevent "icicles" and irregular weld material extending inside the pipe. Where the weld rings have an external diameter approximately equal to the internal diameter of the pipe and are inserted in the latter, they must be removed after the welding operation or the pipe passage will be unduly restricted. As an alternative, the pipe inner wall may be recessed to receive the welding ring, in which case the ring is left within the pipe after welding, but this arrangement requires external reinforcing beads adjacent the joint to compensate for weakening due to removal of metal to form the recess.

Where it is desired to avoid the use of a ring-receiving recess and the accompanying external beads, it is necessary to use the inserted ring structure having the external diameter equal to the internal diameter of the pipe, as previously mentioned. However, it is frequently difficult, if not impossible, to remove such a ring after the welding operation, either because of inaccessibility of the ring, or because of sticking of the ring to the weld material.

Therefore, it is another object of the invention to provide a temporary weld backing element capable of removal after completion of the welding operation.

These and other objects are effected by the invention as will be apparent from the following description and claims taken in connection with the accompanying drawing, forming a part of this application, in which:

Figure 1:
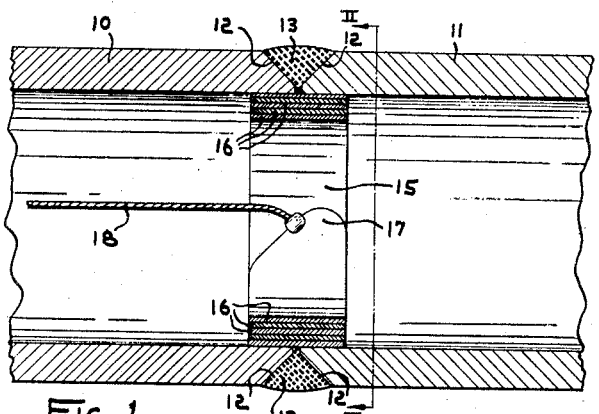
Fig. 1 is a longitudinal sectional view showing a pipe joint weld embodying features of the invention.
Figure 2:
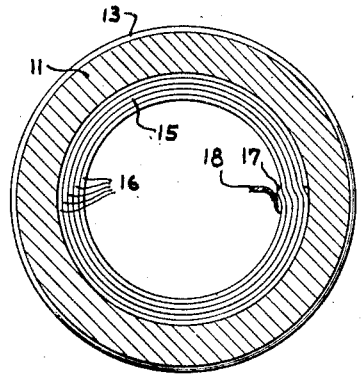
Fig. 2 is a transverse sectional view taken along the line II—II of Fig. 1, looking in the direction of the arrows.

Referring now to the drawing more in detail, and with particular reference to Figs. 1 and 2, there are shown two pipe sections 10 and 11 having their adjacent ends beveled at 12 to provide a circumferential groove for reception of weld material 13. In order to maintain the two sections 10 and 11 aligned and to prevent weld material from passing through the groove to the interior of the pipe, there is provided a welding ring 15 formed of a single strip of relatively thin material wound upon itself to provide a plurality of layers or laminations 16. The inner end 17 of the strip is provided with suitable means, such as the pull cord 18, whereby, upon completion of the welding operation, the ring may be removed by pulling upon the cord 18 to uncoil or unravel the laminations 16.

Preferably, the ring 15 is made from a material to which weld metal does not readily adhere. However, it is contemplated that the nature of the material will vary under different operating conditions. For example, it might be desirable to use a metal having a high degree of spring or resiliency so that the natural tendency of the coiled strip would be to expand and maintain the ring in close contact with the inner walls of the pipe sections 10 and 11. In other situations it might be found desirable to use a more ductile material and to maintain the strip in ring form by the use of an adhesive or light soldering between adjacent layers or laminations.

Figure 3:
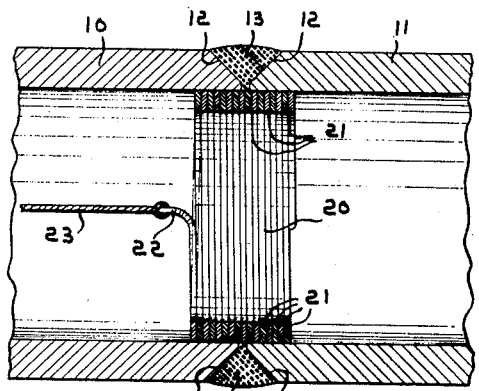
Fig. 3 is a view similar to Fig. 1, but showing a modification of the invention.
Figure 4:
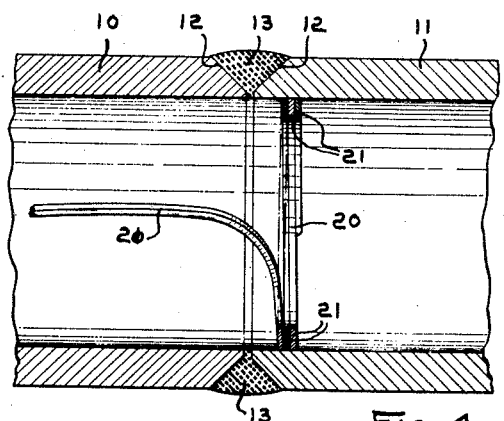
Fig. 4 is a view similar to Fig. 3, showing the welding ring of Fig. 3 partially removed after completion of the welding operation.

In Figs. 3 and 4, there is illustrated a modification of the invention wherein the strip of material is wound to form a ring 20, the laminations 21 of which have their adjacent surfaces lying in planes approximately normal to the longitudinal axis of the pipe sections. In this construction also, one end 22 of the strip is provided with a suitable pull member 23 for unwinding and removal of the strip after completion of the welding operation, as illustrated in Fig. 4.

Figure 5:
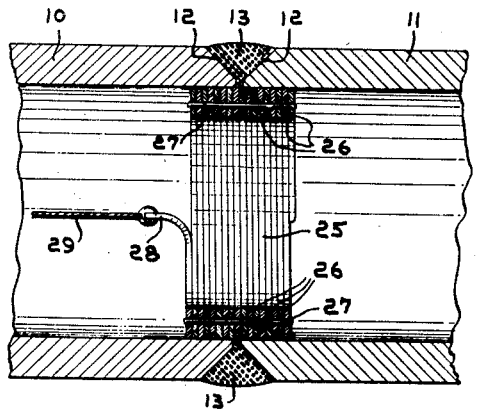
Figs. 5 and 6 are views similar to Fig. 3, but showing further modifications of the invention.
Figure 6:
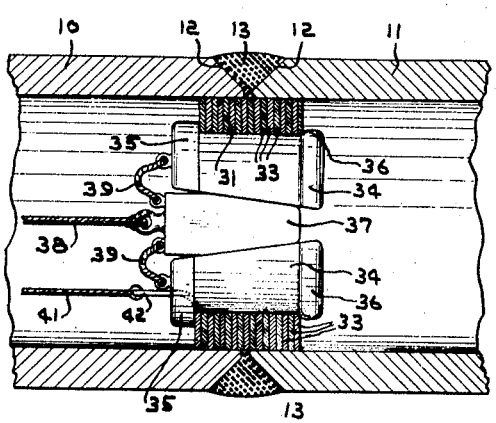

In this construction, as in the arrangement shown in Figs. 1 and 2, the layers or laminations of the ring may be held in abutting relation either by the natural resiliency of the material, by an adhesive or light soldering, by light and easily deformed or broken pins as illustrated in Fig. 5, or by a split spider and wedge as shown in Fig. 6.

In Fig. 5, the ring 25 has its layers or laminations 26 held in assembled relation by one or more light pins 27 extending therethrough and which may be readily broken or deformed sufficiently to release the laminations when a pull is applied to the free ends 28 of the strip by the pull cord 29.

In Fig. 6, the ring 31 is shown as having its laminations 33 retained in assembled relation by a collapsible spider member 34 having shoulders 35 and 36 adapted to engage on either side of the ring 31, the elements of the spider being retained in expanded and locking position with respect to the ring by a mandrel or wedge member 37. In order to remove the ring 31 after completion of the welding operation, it is only necessary to pull on the cord 38, which will first withdraw the wedge 37 and thereafter, due to the connecting cords 39, will remove the spider sections 34. Thereafter the strip may be unwound by pulling upon the cord 41 attached to the free end 42 of the strip forming the ring.

While the invention has herein been illustrated only as applied to the welding of two adjacent sections of pipe, it will be apparent to those skilled in the art that the invention is not so limited but may be applied with equally effective results to the welding of pipe to castings and to the welding of straight or other shaped surfaces.

Likewise, the wound strips from which the rings are formed need not necessarily be flat, but may be of any suitable cross-section, such as round, oval, etc.

While the invention has been shown in several forms, it will be obvious to those skilled in the art that it is not so limited, but is susceptible of various other changes and modifications without departing from the spirit thereof, and it is desired, therefore, that only such limitations shall be placed thereupon as are specifically set forth in the appended claims.

What is claimed is:

1. A backing construction for use internally of abutting ends of members having aligned circular passages while said members are being welded together and adapted to be removed after the welding operation, said construction comprising a relatively thin strip of material wound upon itself to provide a laminated ring removable by unwinding.

2. A backing construction for use internally of abutting ends of members having aligned passages while said members are being welded together and adapted to be removed after the welding operation, said construction comprising a strip of relatively thin material wound to provide a plurality of laminations in the form of a ring, and means for temporarily retaining said laminations in abutting relationship.

3. Structure as specified in claim 2, wherein the retaining means comprises a plurality of deformable pins extending through and uniting the laminations.

4. Structure as specified in claim 2, wherein the retaining means comprises a collapsible spider and expanding mandrel therefor.

5. A backing construction for use internally of abutting ends of members having aligned passages providing annular surfaces while said members are being welded together and adapted to be removed after the welding operation, said construction comprising a laminated ring formed of a relatively thin strip of material wound with the abutting faces of adjacent laminations lying in planes approximately normal to said annular surfaces.

6. Structure as specified in claim 5, including means for temporarily retaining said laminations in abutting relationship.

7. A backing construction for use internally of abutting ends of members having aligned passages while said members are being welded together and adapted to be removed after the welding operation, said construction comprising a relatively thin strip of material wound upon itself to provide a laminated ring, said strip being resilient whereby the laminations are urged into abutting relationship with each other and with the annular surface.

8. Structure as specified in claim 7, including means at the inner end of the wound strip of material providing for removal of the ring after use by unwinding of the strip.

ERNEST F. MILLER.